Dec. 17, 1963     W. LOHS     3,114,194
METHOD OF WIRING ELECTRICAL CIRCUITS
Filed Sept. 3, 1959
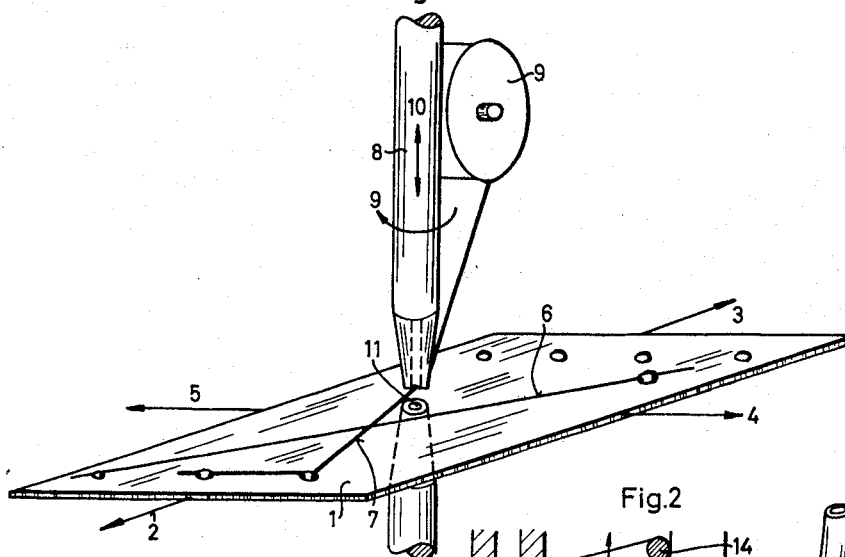
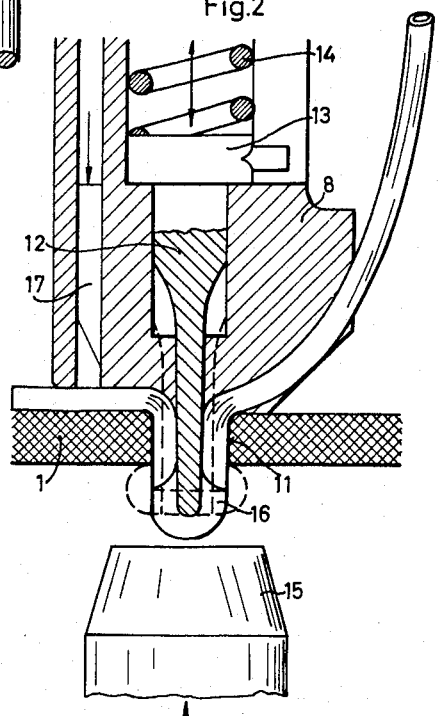
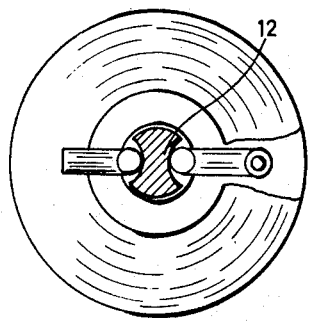
Inventor
Willy Lohs
By
Atty.

United States Patent Office 3,114,194
Patented Dec. 17, 1963

3,114,194
METHOD OF WIRING ELECTRICAL CIRCUITS
Willy Lohs, Munich, Germany, assignor to Siemens and Halske Aktiengesellschaft Berlin and Munich, a corporation of Germany
Filed Sept. 3, 1959, Ser. No. 837,849
Claims priority, application Germany Sept. 10, 1958
1 Claim. (Cl. 29—155.5)

This invention, which may be considered as an improvement on the disclosure contained in copending application Serial No. 784,517, filed January 2, 1959, now Patent No. 3,092,759, owned by the assignee also noted in the present case, relates to wiring electrical circuits and is particularly concerned with the wiring of circuits upon insulating plates provided with holes or bores formed therein.

The copending application discloses a method of and device for wiring electrical circuits, especially circuits used in the communication arts, for example, circuits employed in telephony, wherein wires are according to a predetermined circuit scheme laid out or positioned on an insulating plate serving as a carrier, with portions of such wires placed in looped manner in holes formed in the plate, the looped portions holding the respective wires in position and/or forming terminal means for structural elements such as resistors, capacitors and the like.

The object of the present invention is to provide for wiring of this general type a method and a device permitting laying out wire lengths as short as possible as well as the crossing of wires.

The invention proposes to press portions of insulated wires into holes in an insulating plate, as in the copending application, and where needed, lifting or raising wires by means of a layout head, to place such wires crosswise with respect to previously placed wires.

According to another feature of the invention, the loops of the respective wires are pressed through corresponding holes in the insulating plate in the direction of a punch which thereupon compresses the loop, peening it over and crushing the insulation at the ends of the corresponding loops, whereupon the crushed parts of the insulation are removed, particularly by a brushing operation.

Further objects, features and details of the invention will appear from the description of an embodiment which is rendered below with reference to the accompanying drawing. In the drawing, FIG. 1 shows in schematic manner the various parts involved and the cooperation thereof in laying out wires and in anchoring the wires in place;

FIG. 2 illustrates part of a wire layout head in longitudinal sectional view and part of a punch in elevation, to aid in explaining the forming of a wire loop as well as the compression and peening over of the end thereof and the crushing of the insulation incident to such compression and peening over; and FIG. 3 is a transverse sectional view to show the configuration of a loop-forming plungerlike actuated member.

Like parts are indicated in the figures by like reference numerals.

Numeral 1 denotes the insulating plate which is fastened upon a cross-slide (not shown), adapted to move in suitable manner selectively in the directions indicated by arrows 2, 3, 4 and 5. Numeral 6 shows a wire which had been placed in position previously. A wire 7, which is now to be laid out crosswise of the wire 6, is raised above the wire 6 by means of the layout head 8 carrying a reel 9 containing a supply of the wire 7. The layout head 8 is by suitable means rotatable about its longitudinal axis (arrow 9) and movable longitudinally (arrow 10). The motions of the cross-slide and therewith of the insulating plate 1 are executed coincident with the raising of the wire 7 by the head 8 so as to effect placement of the wire 7 along the shortest path to the desired next anchoring point, assumed to be the point indicated by numeral 11 and represented by a hole in the insulating plate 1. The layout head is at the same time rotated to position the wire 7 for placement in the desired direction.

The loop formation, loop compression and peening over for anchoring are effected when the layout head 8 is in position above and in alignment with the hole 11. The wire 7 is for this purpose first pressed downwardly through the hole 11, by means of a pin 12, the required pressure being exerted on the pin 12 by means of a suitably actuated plunger 13 and a spring 14, thus forming the loop 16 (FIG. 2). The pin 12 is thereupon slightly raised and the punch 15 is pressed against the wire loop 16 protruding downwardly from the hole 11, thereby compressing and flattening the wire loop against the corresponding side of the plate and coincidently crushing the insulation along the flattened portion of the wire loop. A knife 17, guided within the wiring head 8 may thereupon be actuated by suitable means to cut off one end of the wire, if desired.

The layout head 8 is thereafter somewhat raised above the insulating plate 1 and moved relative to previously positioned wires which are to be crossed thereby. The wire insulation which had been crushed incident to the loop compressing and peening-over operation is removed, as by brushing off, after completion of the entire wiring in the plate 1.

Changes may be made within the scope and spirit of the appended claim which defines what is believed to be new and desired to have protected by Letters Patent.

I claim:

A method of laying out insulated electrical wires upon one side of an insulating plate to which portions of the respective insulated wires which are to be laid out are to be anchored, and wherein at least some of said insulated wires are to be laid out so as to extend in crossing relationship with other wires, comprising punching spaced apart anchoring holes in said insulating plate, moving an insulated wire to be laid out on said insulating plate in relatively close proximity to the surface of said plate so as to position it successively in alignment with spaced apart anchoring holes therefor, raising said insulated wire which is thus being moved from anchoring hole to anchoring hole so as to guide it over previously laid out wires in crossing relationship with respect thereto, drawing said insulated wire into an anchoring hole upon alignment thereof with said hole and thereby forming of the corresponding portion of said wire a loop extending through such hole with the legs of said loop in intimate anchoring engagement with the wall of said hole, the end of said loop projecting from said hole on the other side of said plate, thereupon exerting pressure on the projecting end of said loop to flatten such end against the other side of said plate in laterally overlapping relation to the edges of said hole so as to secure the anchoring of said wire portion in said hole, simultaneously crushing the insulation of said wire throughout the extent of the flattened portion which is in overlapping relation with respect to the edges of said hole, and subsequently removing the crushed insulating material.

(References on following page)

References Cited in the file of this patent

UNITED STATES PATENTS

| | | |
|---|---|---|
| 1,837,962 | Hensgen | Dec. 22, 1931 |
| 1,938,410 | Von Billiard | Dec. 5, 1933 |
| 2,427,417 | Prickett | Sept. 16, 1947 |
| 2,433,346 | Deakin | Dec. 30, 1947 |
| 2,436,756 | Larkin | Feb. 24, 1948 |
| 2,810,471 | Shattuck | Oct. 22, 1957 |
| 2,820,843 | Dreher | Jan. 21, 1958 |
| 2,848,792 | Reitz | Aug. 26, 1958 |
| 2,958,926 | Morison | Nov. 8, 1960 |

FOREIGN PATENTS

| | | |
|---|---|---|
| 806,523 | Great Britain | Dec. 31, 1958 |